April 15, 1947.  J. H. BOOTH  2,418,924
STONE COLLECTOR
Filed Feb. 22, 1944
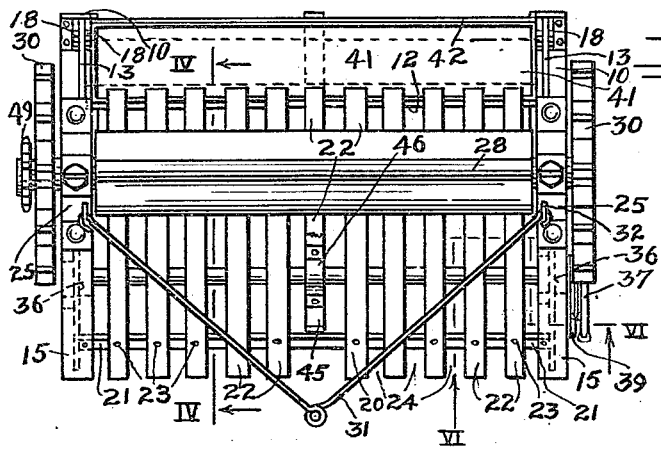
Fig. 1.
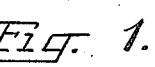
Fig. 5.
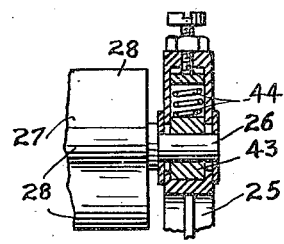
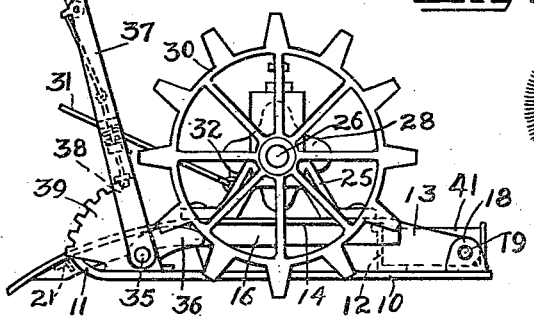
Fig. 2.
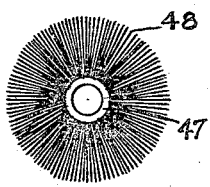
Fig. 8.
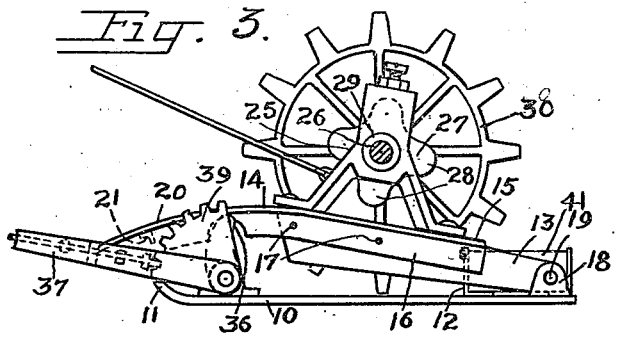
Fig. 3.
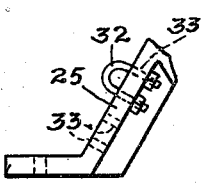
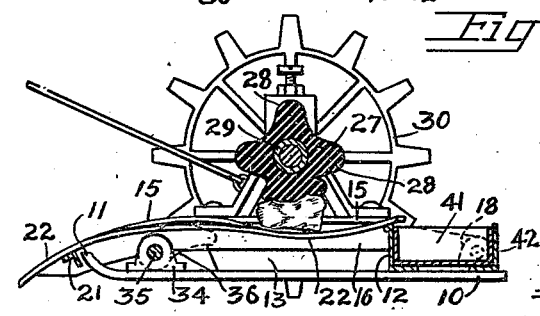
Fig. 4.
Inventor
James H. Booth.
by
Attys.

Patented Apr. 15, 1947

2,418,924

UNITED STATES PATENT OFFICE 2,418,924

STONE COLLECTOR

James H. Booth, Corunna, Mich.

Application February 22, 1944, Serial No. 523,469

6 Claims. (Cl. 55—17)

This invention relates to stone collectors for collecting stones from plowed fields. In working a field after plowing thereof, difficulty is encountered during disking and cultivating operations due to stones, from approximately four to six inches in size, which are brought to the surface by the plow head and when struck by the disking, harrowing or cultivating implements, may seriously damage the same.

An important object of the invention is to produce a simple collector structure which, when drawn over a plowed field, will rake and scoop up stones brought to the surface by plowing for discharge into a removable receptacle on the collector from which the collected stones may be dumped at the side of a field.

A further object of the invention is to provide a collector structure or machine comprising a row of spaced apart longitudinally extending resilient bars deflected or bowed downwardly at their forward ends so that when the collector is drawn over a plowed field, the ends of the bars will engage under stones for travel of the stones along the bars into the receptacle, together with means spanning the bars in advance of the receptacle and rotatable for engagement with the stones to wipe or brush off dirt or clods that might adhere to the stones, and to urge the stones toward the receptacle.

Another important object is to provide over the collector bars a transversely extending rotary member having radially extending resilient or flexible arms for engagement with the stones to remove dirt or clods therefrom and to urge them towards the receptacle.

Still another object is to provide tooth wheels on the shaft of the rotary member for engagement with the ground to rotate the rotary member when the machine is being drawn over the ground.

Still a further object is to provide a supporting structure including longitudinally extending runner bars for supporting the machine when being drawn over the ground for collecting stones, and to provide means for raising the collector bar structure and the rotary member thereon away from the supporting structure for holding the bowed ends of the bars and the teeth on the wheels above the ground when the machine is being drawn over harder ground to or away from the plowed field from which the stones are to be collected.

Other and further objects of the invention will become apparent to those skilled in the art from the following detailed description of the annexed sheet of drawings which discloses a preferred embodiment of my invention.

On the drawing:

Figure 1 is a plan view of the machine;

Figure 2 is an enlarged end view of the machine;

Figure 3 is a view like Figure 2 but showing one of the tooth wheels removed and the collector bar and wheel structure held in raised position on the supporting structure;

Figure 4 is an enlarged section on plane IV—IV Figure 1;

Figure 5 shows a spring supported journal box arrangement for the shaft of the rotary stone engaging member;

Figure 6 is an enlarged section on line VI—VI Figure 1;

Figure 7 is an end view of a portion of one of the bearing standards for the shaft of the rotary member to show the manner of attaching to the bearing standards a draw bar structure by which the machine may be drawn by animal or mechanical power; and Figure 8 shows a modified form of rotary member.

The supporting structure for the machine is in the form of a sled frame comprising shoes or runners 10, one on each side of the machine, the runners being in the form of flat bars having their forward ends 11 turned up for guiding the runners over the ground. An L-shaped cross beam 12 extends between and is secured at its ends to the tops of the runners 10 a distance inwardly from the rear ends thereof, and this cross beam may be welded, riveted or otherwise secured to the runners.

The stone collector frame is supported on the runner structure. It comprises side beam structures hinged at their rear ends to the rear ends of the runner bars. Each side beam structure comprises a plate 13 and T-bar 14. The rear portion of each T-bar rests with its top wall 15 on the plate 13 along the forward portion thereof and the web 16 of the T-bar is secured against the outer side of the plate 13 as by riveting or spot welding 17. Each runner 10 has at its rear end upstanding ears 18 between which the rear end of the corresponding plate 13 is received to be hinged to the runner bar by a pin 19. The ends 20 of the T-bars forwardly of the front ends of the plate 13 are gradually curved or bowed downwardly and in their outer ends are secured as by welding or riveting to the ends of a cross bar 21, this cross bar being shown in the form of an angle bar whose upper flange is welded against the under side of the top walls 15 of the T-bars. Between the side beam structures which are hinged to the runner bars is a row of longitudinally extending resilient flat collector bars 22, these collector bars extend parallel with the T-bars 14 and are secured to the cross bar 21 as by riveting or welding as indicated at 23. The collector bars are separated by spaces 24 and at their rear ends extend a short distance beyond the upper edge of the cross beam 12 on the runner structure.

Mounted on the inner portions of the T-bars are bearing standards 25 for a shaft 26 which mounts a roller 27 of resilient material, such as rubber, and which may be fluted to provide resilient radial projections 28. This resilient roller may be secured to a metal bushing 29, which in turn, is keyed or otherwise secured to the shaft 26. At each end of the shaft 26 a toothed wheel 30 is secured which wheels function to rotate the shaft 26 and the roller thereon in counterclockwise direction (Figure 2) as the machine is drawn forwardly over a plowed field. For drawing the machine, a V-shaped draw bar 31 may be provided for attachment by U-bolts 32 to the bearing standards 25. As shown on Figure 7, these bearing standards have holes 33 therethrough spaced apart so that the U-bolts may be attached at different levels to the bearing standards.

The stone collector frame including the hinged side beam structures, the collector bars and the roller structure and driving wheels therefor, may be swung down into operating position or up into idle position relative to the runner structure. When swung down into operating position, the T-bars 14 at their forward ends will rest against the turned-up ends of the runner bars and the teeth of the driving wheels 30 will project down below the runner bars for engagement with the ground for turning of the roller structure as the machine is drawn over a plowed field. Means are provided for swinging the collector assembly upwardly to bring the front ends of the collector bars 22 and the teeth of the wheels above the level of the runner bars when the machine is to be drawn over hard ground to or away from the plowed field. Mounted on the runner bars 10 near their forward ends are bearing brackets 34 for journaling a shaft 35 from which cam arms 36 extend for engagement with the under sides of the top walls of the T-bars. The shaft is rotatable by means of a lever 37 extending from one end thereof, and a locking detent 38 is provided on the lever for engagement with a rack segment 39 mounted on the runner bars. As shown on Figure 6, the shaft extends through the rack segment and the segment is secured to the runner bar to extend upwardly outside of the path of the corresponding T-bar to be between the lever 37 and the corresponding cam arm 36, the corresponding bearing bracket 34 for the shaft being set inwardly on the runner bar to leave the clearance space 40 between the bearing bracket and the cam arm for receiving the vertical web 16 of the T-bar when the collector assembly is swung down into operative position, the shaft 35 then serving to hold the forward ends of the runner bars in proper parallel alignment. When it is desired to raise the collector assembly into idle position, the lever 37 is swung for engagement of the cam arms with the T-bars for upward swing of the collector assembly away from the runner structure, as shown on Figure 3.

When the machine is in operating position and is dragged over the ground, the downwardly inclined or bowed forward ends of the collector bars 22 will be projected a distance into the ground to rake or scoop up stones which are encountered. The smaller stones will pass through the spaces 24 between the collector bars but larger stones will be moved upwardly and rearwardly along the bars toward the rear ends thereof and during their rearward travel, the stones will be engaged by the resilient roller 27, whose resilient projections 28 will knock or wipe off dirt or clods from the stones and will then urge and propel them rearwardly on the collector bars. To receive the stones, a receptacle 41 extends between and is supported on the runner bars 10 as shown on Figure 4. The forward edge of the receptacle may rest on the horizontal flange of the cross beam 12, and for supporting the receptacle along its rear edge an angle bar 42 may be extended between the runner bars. As the collector bars 22 are resilient, they will be flexed downwardly to relieve the strain on the roller, the collector bars being then fulcrumed at their rear ends on the upper edge of the cross beam 12, as shown on Figure 4. In order to relieve the resilient roller and also the collector bars from undue strain when larger stones pass through the machine, resilient bearing supports may be provided for the roller shaft. Referring to Figure 5, the shaft is journaled in bearing blocks 43 movable upwardly in the bearing standards against the resistance of springs 44. When normal size stones pass through the machine, the springs 44 will hold the shaft and the roller down in normal position, but upon the passage of abnormally large stones through the machine, the springs 44 will yield to relieve the upward pressure on the roller.

An intermediate runner bar 45 is provided on wide machines, as shown, and has a bearing bracket 46 thereon for receiving the shaft 35 and which at its rear end will be secured to the cross beam 12 and the cross bar 42 to be held in proper alignment. The intermediate runner bar may be omitted from narrow machines.

Instead of a fluted rubber roller, a modified form of roller may be provided, such as shown on Figure 8. This modified form of roller has a hub or bushing 47 which may be keyed or otherwise secured to the shaft 26 and from which bristles, preferably in the form of flexible metal rods 48, extend radially. When this form of roller rotates as the machine is dragged over the ground, the bristles will engage with the stones to remove dirt and clods and will urge the stones rearwardly along the bars 22 toward the receptacle 41.

Instead of the toothed wheels 30, the shaft 26 may be provided with a sprocket wheel 49 for chain drive by power from the tractor which tows the machine.

I have thus produced an efficient and economically manufactured stone collector on which a roller structure engages with the stones to first break up and clean off dirt or clods from the stones and then urge them along for discharge to a receptacle which can be readily removed for dumping of the collected stones therefrom.

I do not however, desire to be limited to the exact construction, arrangement or operation shown and described as changes and modifications may be made without departing from the scope of the invention.

I claim as my invention:

1. A machine for the purpose described comprising a sled frame for supporting the machine when drawn over the ground, longitudinally extending spaced apart collector bars mounted on said frame, the forward portions of said bars being inclined downwardly for projection into the ground to scoop up plowed-up stones for travel of the stones rearwardly along the bars, a receptacle on said sled frame at the rear thereof for receiving the stones from said bars, bearing standards at the sides of said sled frame, a shaft journaled in said bearing standards, a resilient rubber roller mounted on said shaft to extend transversely over said bars, and means for rotating said shaft for rotation of said roller and downward pressure engagement thereof with the stones for cleaning of the stones and propulsion thereof rearwardly on said bars for discharge into said receptacle.

2. A machine for the purpose described comprising a supporting frame having ground engaging runners, a stone collector frame mounted on said supporting frame, a row of longitudinally extending spaced apart resilient collector bars on said collector frame, a solid roller of resilient material journaled on said collector frame and extending transversely thereof above said collector bars, means for driving said roller when said machine is drawn over the ground, the forward ends of said collector bars being bowed downwardly for picking up stones for travel rearwardly along said bars and for engagement by said roller to be impelled toward the rear of said bars, and a receptacle on said supporting frame for receiving the stones, said resilient bars and said resilient roller yielding for the passage of larger size stones therebetween.

3. A machine for the purpose described comprising a supporting structure, a collector frame on said supporting structure comprising longitudinally extending spaced apart collector bars supported at their front and rear ends on said supporting structure, a shaft journaled on said supporting structure and extending transversely thereover above the intermediate portions of said collector bars, a resilient rubber roller mounted on said shaft, means for rotating said shaft with said roller when said machine is drawn over the ground, the forward ends of said collector bars being deflected for engagement below stones for travel of the stones along said bars for engagement by said roller to be forced thereby toward the rear ends of said bars, said bars being resilient whereby to prevent straining of said roller when large size stones are engaged thereby, and a receptacle on said supporting structure for receiving the collected stones.

4. A machine for the purpose described comprising a supporting frame having runners at its sides and a cross beam connecting said runners near their rear ends, a stone collector frame comprising side beams hinged at their rear ends to the rear ends of said runners, a cross bar near and extending between the front ends of said side beams, collector bars secured at their front ends to said cross bar and extending rearwardly with their rear ends overlapping said cross beam, bearing standards on said side beams, a shaft journaled in said bearing standards to extend across said collector frame above said collector bars, a stone engaging resilient roller mounted on said shaft, a toothed wheel on said shaft, the front portions of said side beams and collector bars being curved downwardly, said collector frame when swung down to its lower position on said support projecting said curved ends into the ground below the surface thereof and exposing the teeth of said wheel to the ground for rotation of said roller when said machine is drawn forwardly, stones engaged by said curved ends being guided along said bars to be engaged by said roller to be urged to the rear of said bars, a receptacle on said support for receiving the collected stones, and cam means on said support engageable with said side beams for upward swing of said collector frame to clear the curved ends of said bars and the teeth of said wheels from the ground.

5. A collecting machine comprising a longitudinally extending collector frame inclined downwardly at its forward end and adapted for engaging under plowed stones to scoop them up for travel rearwardly over the frame as the machine is drawn over the ground, a receptacle mounted on the machine at the rear of the collector frame for receiving the stones from the frame, a shaft journaled on said frame to extend transversely thereover in advance of the receptacle, a fluted resilient roller mounted on said shaft and overlying said frame, and means on said shaft engageable with the ground to be rotated when said machine is drawn over the ground for rotation of said roller, said roller having pressure engagement with stones on said collector frame for removing dirt therefrom and for urging the stones rearwardly along the frame toward said receptacle.

6. A collector machine comprising a frame having longitudinally extending spaced apart collector bars thereon, said bars having downwardly inclined forward end portions adapted for engaging under plowed stone to scoop them up for travel rearwardly over the bars as the machine is drawn over the ground, a receptacle mounted on the machine at the rear of the collector frame for receiving the stones from the frame, a shaft journaled on said frame to extend transversely thereover in advance of said receptacle, a roller of resilient material mounted on said shaft, means on said shaft engageable with the ground to be rotated when said machine is drawn over the ground for rotating said roller in a direction to engage with the stones for removing dirt therefrom and for urging the stones rearwardly toward said receptacle, and yieldable bearings on said frame for said shaft to protect said roller against undue strains.

JAMES H. BOOTH.

REFERENCES CITED

The following references are of record in the file of this patent:

UNITED STATES PATENTS

| Number | Name | Date |
| --- | --- | --- |
| 2,030,587 | Heaslet | Feb. 11, 1936 |
| 47,566 | Quimby | May 2, 1865 |
| 2,114,263 | Heaslet | Apr. 12, 1938 |
| 95,242 | Locke | Sept. 28, 1869 |
| 1,535,321 | Larsen et al. | Apr. 28, 1925 |